(12) United States Patent
Qin et al.

(10) Patent No.: US 9,654,706 B2
(45) Date of Patent: May 16, 2017

(54) METHOD FOR REDUCING IMAGE FUZZY DEGREE OF TDI-CCD CAMERA

(71) Applicant: SOUTHWEST JIAOTONG UNIVERSITY, Chengdu, Sichuan (CN)

(72) Inventors: Jun Qin, Chengdu (CN); Yinan He, Chengdu (CN)

(73) Assignee: SOUTHWEST JIAOTONG UNIVERSITY, Jiniu, Chengdu, Sichuan (CN)

(*) Notice: Subject to any disclaimer, the term of this patent is extended or adjusted under 35 U.S.C. 154(b) by 0 days.

(21) Appl. No.: 14/905,866

(22) PCT Filed: Dec. 22, 2013

(86) PCT No.: PCT/CN2013/090175
§ 371 (c)(1),
(2) Date: Jan. 18, 2016

(87) PCT Pub. No.: WO2015/007065
PCT Pub. Date: Jan. 22, 2015

(65) Prior Publication Data
US 2016/0165155 A1 Jun. 9, 2016

(30) Foreign Application Priority Data

Jul. 18, 2013 (CN) .......................... 2013 1 0302808

(51) Int. Cl.
*H04N 5/228* (2006.01)
*H04N 5/357* (2011.01)
*G06T 5/00* (2006.01)
*G06T 5/50* (2006.01)
*H04N 5/372* (2011.01)

(52) U.S. Cl.
CPC ............. *H04N 5/357* (2013.01); *G06T 5/003* (2013.01); *G06T 5/50* (2013.01); *H04N 5/37206* (2013.01); *G06T 2207/10032* (2013.01); *G06T 2207/20076* (2013.01); *G06T 2207/20201* (2013.01); *G06T 2207/30181* (2013.01); *G06T 2207/30212* (2013.01)

(58) Field of Classification Search
CPC ........... H04N 5/23248; H04N 5/23264; H04N 5/23267; H04N 5/2327; G03B 2217/005; G03B 2207/005
USPC ................. 348/208.99, 208.4–208.6, 208.13
See application file for complete search history.

(56) References Cited

U.S. PATENT DOCUMENTS 9,185,290 B1 * 11/2015 Lapstun ............. H04N 5/23238
2002/0047896 A1 * 4/2002 Basiji .................... G01J 3/2803
348/61

(Continued)

*Primary Examiner* — Kelly J Jerabek
(74) *Attorney, Agent, or Firm* — Meng Ouyang

(57) ABSTRACT

The present invention belongs to the field of image processing, and particularly relates to the determination of an aerial remote sensing image fuzzy parameter and the elimination of aerial remote sensing image fuzziness based on a TDI-CCD camera. The method comprises the following specific steps: establishing an image coordinate system, reading an area array image, constructing a similarity matching criterion, conducting offset resolving to acquire homonymy points so as to obtain a digital image reducing the chattering influence. The method is relatively simple and precise in computing process, and good in processing effect.

5 Claims, 5 Drawing Sheets

(56) References Cited

U.S. PATENT DOCUMENTS

| | | | |
|---|---|---|---|
| 2007/0146873 A1* | 6/2007 | Ortyn | G01N 21/6458 359/386 |
| 2010/0046853 A1* | 2/2010 | Goodnough | H04N 5/37206 382/275 |
| 2011/0115793 A1* | 5/2011 | Grycewicz | G06T 3/4069 345/428 |
| 2013/0194443 A1* | 8/2013 | Weigand | H04N 5/23248 348/208.99 |

* cited by examiner

METHOD FOR REDUCING IMAGE FUZZY DEGREE OF TDI-CCD CAMERA

TECHNICAL FIELD OF THE INVENTION

The current invention belongs in the field of image processing; in particular, it is related to the determination of the parameters of blur of aerial remote sensing images and the removal of the blur of aerial remote sensing images.

BACKGROUND OF THE INVENTION

High-resolution remote sensing images are widely used in areas such as reconnaissance, geographical information system (GIS), digital city and road construction. The imaging devices that are carried on aircrafts and spacecrafts domestically and internationally, which use Time Delay Integration Charge Coupled Device (hereafter abbreviated as TDI-CCD) as the imaging target surface are called TDI-CCD cameras. TDI-CCD camera utilizes a technique that integrates the radiation energy of the same instant field of view (IFOV) on the ground m times, which is equivalent to increasing the exposure time of the same instant field of view from T to mT, but without the need to reduce the flying speed of the flying vehicles. Using this characteristic of the TDI-CCD cameras, images with geometrical resolutions higher than images obtained through single-integration technique may be obtained. The structure of the TDI-CCD cameras is a rectangular CCD array-oriented with a very large length to width ratio, which is functionally speaking equivalent to a linear array CCD. The important prerequisite for a TDI-CCD camera to obtain high-quality images is: all of the m CCD pixels having the logic relationship of delayed integration correspond to the same instant field of view, but the vibrations of the remote sensing platforms such as satellites and aircrafts prevent the imaging environment of the TDI-CCD cameras from satisfying this prerequisite. Satellites in operation have low-frequency vibrations caused by rigid body movement and middle- to high-frequency vibrations caused by the operations of the components for attitude control of the carrying capsulepayloads, for example, the vibrations caused by movements of the sun panels and the vibrations caused by the dynamic unbalance of flywheels or moment-control gyros. The vibration becomes divergent when the frequency and amplitude reach a certain critical value, thus flutter occurs. Oscillation is a very complicated physical phenomenon. For satellite platform, the oscillations of the satellite caused by perturbation could be the oscillations of a certain component, the coupling oscillations of several components, as well as the oscillations of the whole satellite. The TDI-CCD camera carried on a satellite is affected by oscillations, showing as the oscillations of the six exterior orientation elements (spatial locations (X, Y, Z) and the roll angles, pitch angles and yaw angles around the three axes x, y and z) of the camera. The irregular reciprocating translations of the camera in the three-dimensional spatial locations, the reciprocating angular vibrations around the three optical axes of the camera, and the composite motions caused by the disalignment of the optical center of the camera and the center of vibration of the flying vehicle form a very complicated process. But the results are similar: the oscillations described above cause the m CCD pixels having a logic relationship of delayed integration not to completely correspond to the same field of view, energies from different instant fields of view are superimposed as the energy from the same instant field of view, the motion blurs of imaging during flight of the flying vehicle is also superimposed, causing declines of the spatial resolutions of the remote sensing images, loss of the detail information and distortions of the pixel radiation energies. In the same oscillation environment, the higher the geometrical resolution of imaging, the larger the effect caused by oscillations on image blur. This result is contradictory to the original intention of using TDI-CCD cameras to obtain images with high spatial resolution.

In the remote sensing imaging process of the TDI-CCD cameras, M-level-integral correspond to the energy of m ground instant fields of view. If, ignoring the effect of the change of the instant field of view on the blur of the images in one integration period, using the instant field of view under an oscillation-free ideal environment as the true location, then the m instant fields of view of the ground actually obtained have misalignment errors of varying degrees relating to the true location. We further decompose this kind of misalignment errors into the following three vectors: the front (back) misalignment along the direction of integration of the TDI-CCD (the heading of the flying vehicle); the misalignment to the left and right perpendicular to the direction of integration of the TDI-CCD; the rotational misalignment rotating around the vertical axis.

Currently, the processing methods directed at image blurs are roughly direct algorithm and blind restoration algorithm, iterations algorithm. The direct calculation method is to extract motion functions from the images themselves, but because of the randomness of the excitation time of the multiple types of vibration sources, this method results in complexity and irregularity of the combined effect of the vibrations. This causes the algorithm of inversion not able to be accurate, and the result of blur removal is not satisfactory. However, although the blind restoration algorithm does not require the point spread function to be known beforehand, this algorithm needs conducting of an initial estimation of the point spread function, and the accuracy of the estimation is uncertain, and relatively good blur removal result cannot be obtained.

SUMMARY OF THE INVENTION

To eliminate the degradation of image quality caused by oscillations, the current invention puts forth a new transmission process of TDI-CCD camera signals, and provides a new data processing method directed toward this process:

The target area of the TDI-CCD camera utilized in the current invention is n columns and m rows, and the steps are described below:

S1. establish a coordinate system of the image: the direction of the number of pixels on the TDI-CCD camera area array, i.e., the direction of columns, is the Y axis, while the direction of the grade of the pixels on the TDI-CCD camera area array, i.e. the direction of rows, is the X axis, the upper left corner of the image is the starting point of the coordinate system, wherein the coordinate for the first row and first column is (0,0);

S2. read the area array images of the TDI-CCD camera outputted from each integration and number the images: the images are sequentially numbered as $G_1$, $G_2$, $G_3$ ... $G_t$ ... $G_m$;

S3. decompose the area array images: decompose each image read in S2 by rows, the area array images outputted from each grade of integration are decomposed into m rows, each row having n pixels, each row forms a one-dimensional digital signal after decomposition, the signal length being n, the first N pixels are extracted from each one-dimensional digital signal, separately forming one-dimensional digital signal series recorded as f(t), wherein 0≤t≤m, 0≤N≤n;

S4. according to the one-dimensional digital signal series, construct similarity matching rules for two one-dimensional signal series, including:

S41. Select the signal series f(i) as the benchmark series, carry out comparison between the signal series f(j) and the benchmark series, the neighborhood identicalness matching condition for the signal series is: $\|v_{ij}-v_{kl}\|\leq 5$, wherein indicates the 2-norm operation $v_{ij}$ indicates the disparity vector between any two pixels of the two signal series, i represents the index of the pixels in the signal series f(i), j represents the index of the pixels in the signal series f(j), k is the neighborhood of i, l is the neighborhood of j;

S42. calculate the initial matching probability according to the neighborhood identicalness matching condition of said signal series of S41:

$$p_{ij}^{(0)} = \frac{1}{1+w_{ij}},$$

wherein $w_{ij}\Sigma_{|\lambda|\leq k}[g_1(i+\lambda)-g_2(j+\lambda)]^2$, $p_{ij}^{(0)}$ is the initial matching probability, $g_1(i+\lambda)$ represents the gray value at the $(i+\lambda)^{th}$ pixel of the one-dimensional signal series f(i), $g_2(j+\lambda)$ represents the gray value at the $(j+\lambda)^{th}$ pixel of the one-dimensional signal series f(j);

S43. according to relaxation method, establish the iteration formula) of $q_{ij}$: $p_{ij}^{\sim(r)}=Ap_{ij}^{(r-1)}+Bq_{ij}^{(r-1)}$, wherein $$q_{ij} = \sum_k \sum_l p_{kl},$$

r is iterations), A and B are constants;

S44. according to the iteration formula of S43, obtain the post-normalization matching probability $$p_{ij}^{(r)}: p_{ij}^{(r)} = \frac{p_{ij}^{\sim(r)}}{\sum_h p_{ij}^{\sim(r)}},$$

wherein, h represents all the points that match i;

S45. the Convergence of the sequence of $p_{ij}'$ can be known according to the matching probability obtained in S44, i.e. $p_{ij}\approx 1$, and the other elements approach 0, wherein, $$p_{ij}^r = \begin{bmatrix} p_{0,0} & p_{0,1} & p_{0,2} & p_{0,3} & \cdots & p_{0,99} \\ p_{1,0} & p_{1,1} & p_{1,2} & p_{1,3} & \cdots & p_{1,99} \\ p_{2,0} & p_{2,1} & p_{2,2} & p_{2,3} & \cdots & p_{2,99} \\ p_{3,0} & p_{3,1} & p_{3,2} & p_{3,3} & \cdots & p_{3,99} \\ \vdots & \vdots & \vdots & \vdots & \ddots & \vdots \\ p_{99,0} & p_{99,1} & p_{99,2} & p_{99,3} & \cdots & p_{99,99} \end{bmatrix}$$

S5. conduct offset calculation according to the neighborhood matching calculation results, obtain the identical point in the images, including:

S51. select the upper and lower neighborhoods corresponding to the benchmark signal series for cycle comparisons, establish the corresponding relationship of the first pair of tie points $g_1(x_1, y_1)$ and $g_2(x_2, y_2)$ by comparing the benchmark signal series and the neighboring series in the next image;

S52. determine the s known corresponding points of the images according to the corresponding relationship of similarity on the row dimension of the one-dimensional digital signals obtained in S51, in combination with binary quadratic polynomial, using least squares method, obtain $x_1$ and $y_1$ by carrying out surface fitting of the data of the corresponding tie points:

$x_1=a_{00}+a_{10}x_2+a_{01}y_2+a_{11}x_2y_2+a_{20}x_2^2+a_{02}y_2^2$ $y_1=b_{00}+b_{10}x_2+b_{01}y_2+b_{11}x_2y_2+b_{20}x_2^2+b_{02}y_2^2$;

S6. conduct spatial geometrical correction on the images according to the $x_1$ and $y_1$ obtained in S5, and use double direction linear interpolation to carry out pixel gray value reassignments;

S7. carry out traversal operations on subsequent images relative to the benchmark image G1, traverse step S3 to step S6;

S8. superimpose the one-dimensional signal series having the same instant field of view in the corrected images in the coordinate system to become the first row of the digital image of the images with the flutter effects removed, repeat step S3 to step S8, arrange each row of the superimposed images obtained with reduced oscillation effects according to spatial and chronological order to form digital images with reduced oscillation effects.

Furthermore, said k of S41 is the neighborhood of i that meets the identicalness matching condition, said l is the neighborhood of j that meets the identicalness matching condition.

Furthermore, said 0≤i≤N−1, 0≤j≤N−1 in S41

Furthermore, said number of iterations r of S43 satisfies 1≤r≤N.

Furthermore, for said s known corresponding points of S52, m−4≤s≤m−1.

The effects of the current invention: conduct offset calculation in the process of removing blurs from the images, correct the blurs caused by oscillations, the calculation process is relatively simple and accurate, and relatively good blur-removal effects can be obtained.

EMBODIMENTS

Figure 1:
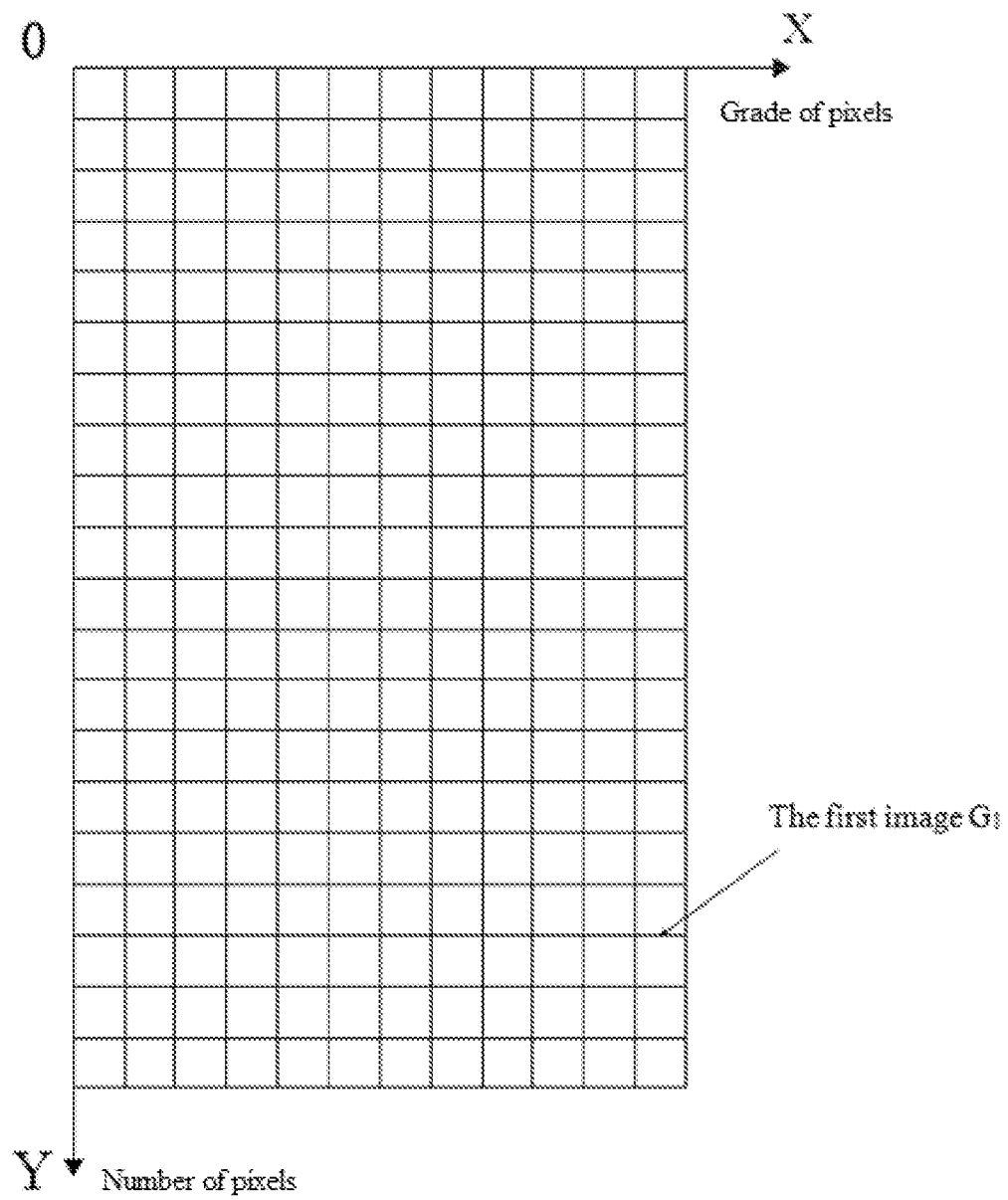
FIG. 1 is the established coordinate system of the planar image.
Figure 2:
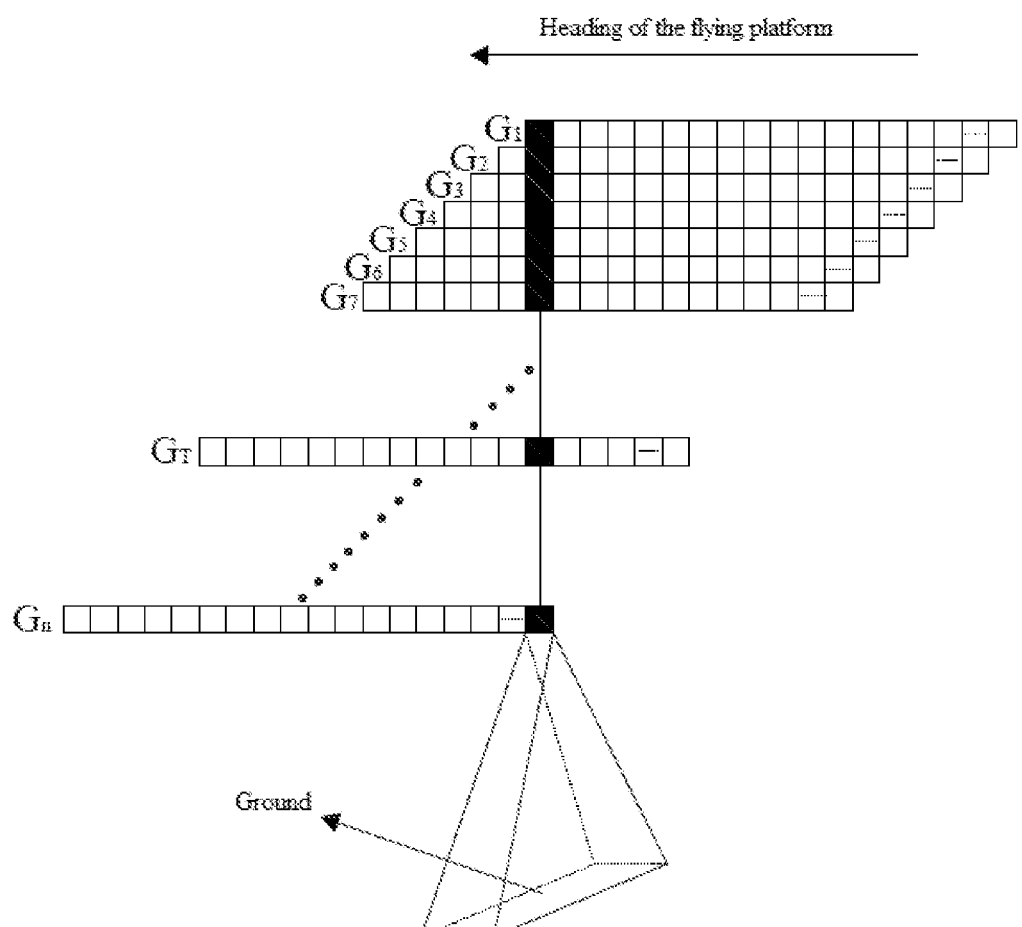
FIG. 2 is the sectional drawing of the corresponding relationships between the m images and the ground target in the ideal working mode the TCI-CCD camera.
Figure 3:
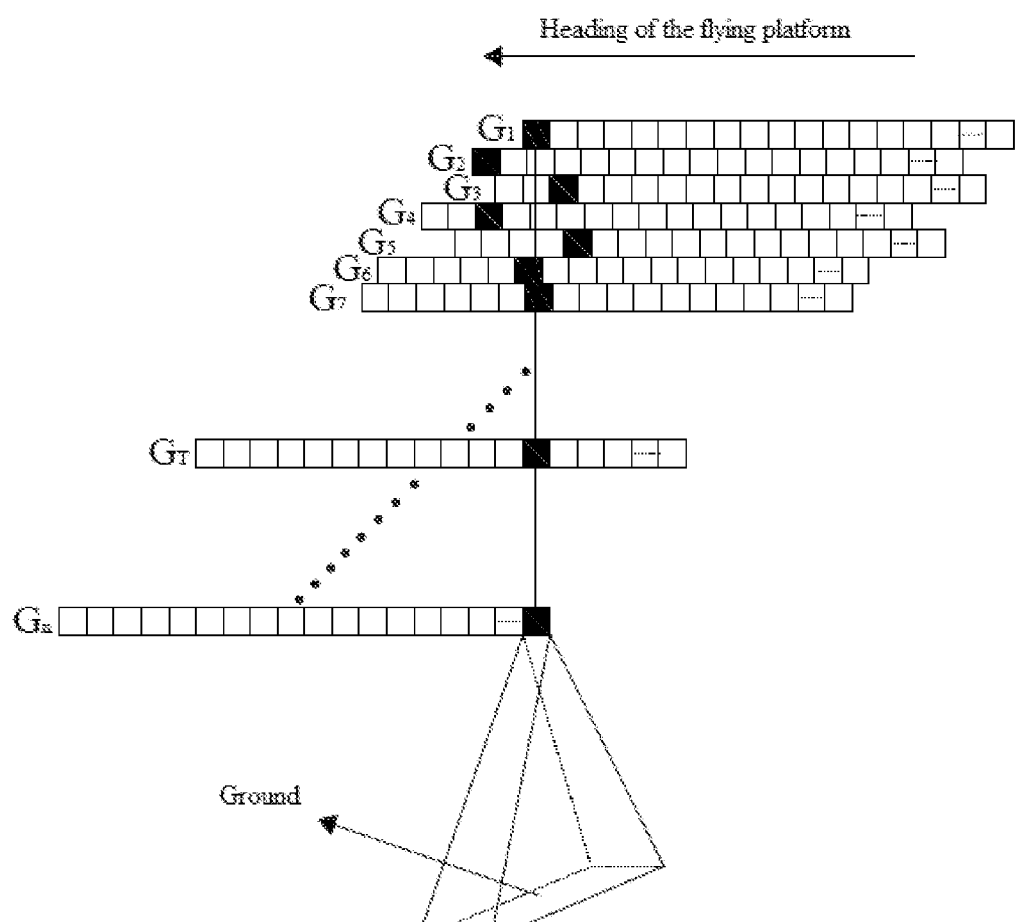
FIG. 3 is the sectional drawing of the corresponding relationships between the m images and the ground target under oscillation conditions of the TCI-CCD camera.
Figure 4:
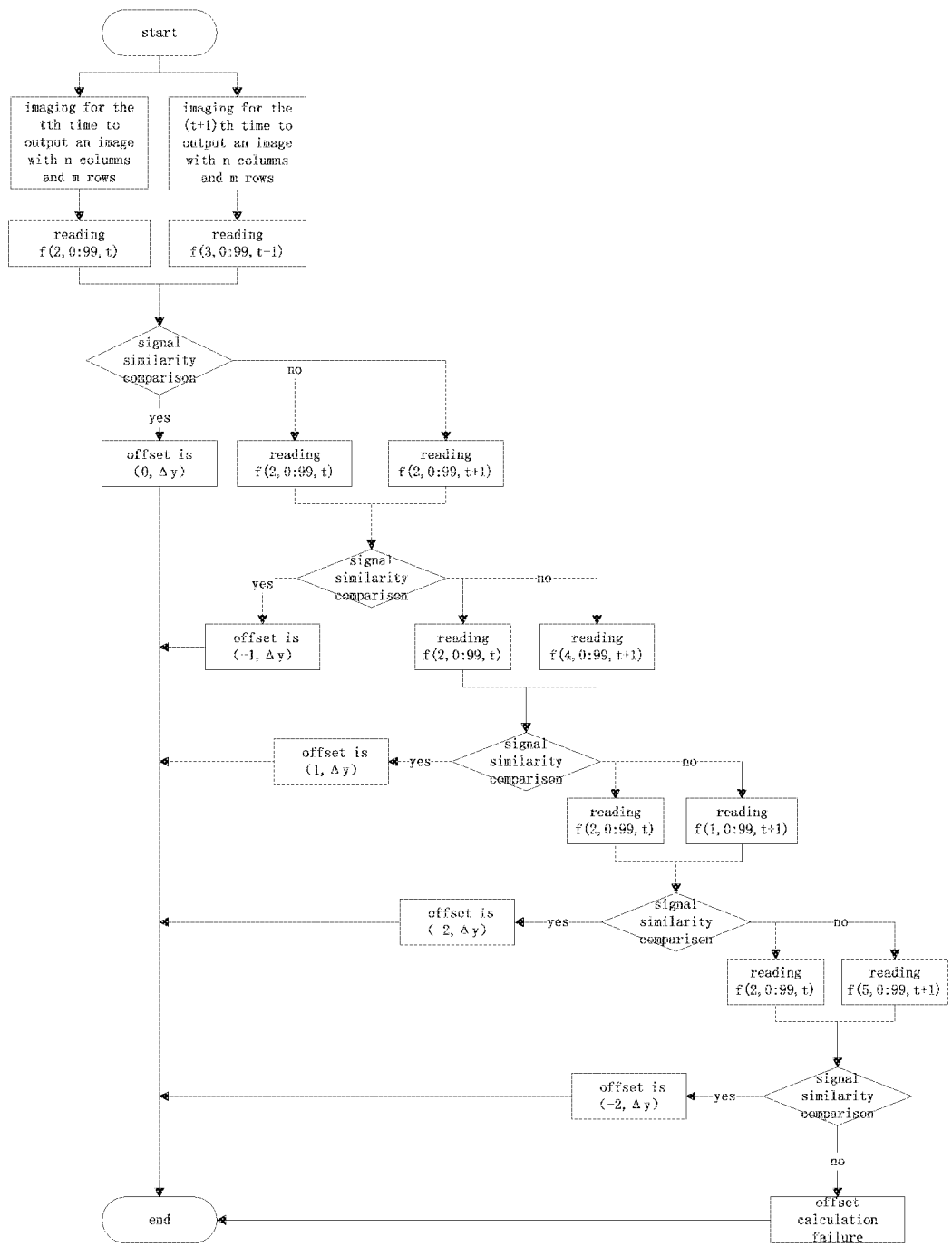
FIG. 4 is the workflow chart for calculating the amount of offset between the similar row signals of the $t+1^{th}$ image and the $t^{th}$ image.
Figure 5:
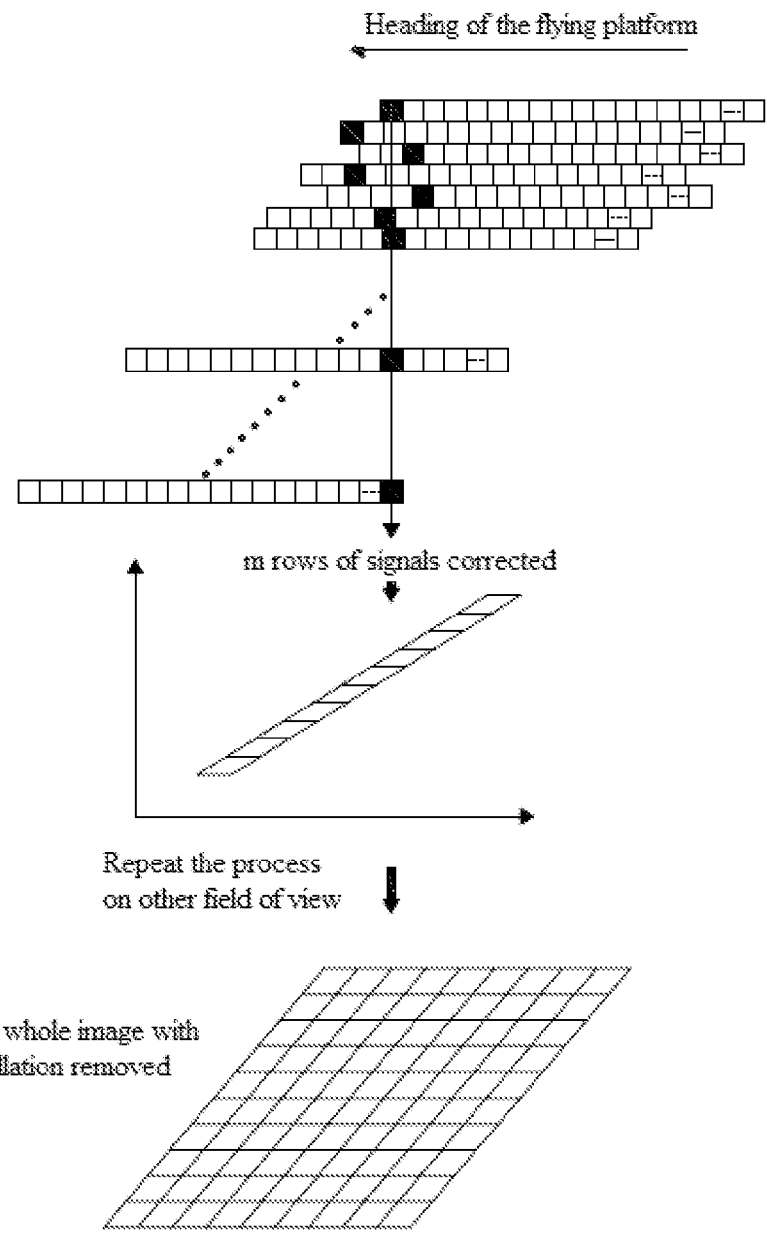
FIG. 5 is the schematic drawing of the workflow to restore oscillation images through the current method.

The embodiments of the current invention are presented below in combination with the figures:

For the convenience of description, we select a TDI-CCD camera with the number of column pixels being 1024 and the number of row pixels being 32.

S1. Establish a coordinate system of the image: the direction of the number of pixels on the TDI-CCD camera area array, i.e., the direction of columns, is the Y axis, while the direction of the grades of the pixels on the TDI-CCD camera area array, i.e. the direction of rows, is the X axis, the upper left corner of the image is the starting point of the coordinate system, wherein the coordinate for the first row and first column is (0,0).

S2. Set the series of the TDI-CCD camera as 1, each grade of integration outputs an area array image of 32 rows and 1024 columns, the area array images are sequentially numbered as $G_1, G_2, G_3 \ldots G_t \ldots G_{32}$. Set $G_1$ as the benchmark reference image, wherein $g_t(x_t, y_t)$ is the pixel gray value of $G_t$ at $(x_t, y_t)$.

S3. Perform decomposition on the area array images: decompose each area array image read in S2 by rows, the area array image outputted by each series is decomposed into 32 rows, each row having 1024 pixels. After the decomposition, each row forms a one-dimensional digital signal, the length of the digital signal being 1024. Extract the first 100 pixels from each one-dimensional digital signal, respectively forming an one-dimensional digital signal series that is recorded as f(t), the length of the one-dimensional digital signal series being 100;

S4. Construct a similarity matching rules for two rows of one-dimensional digital signal series:

One-dimensional digital signal series f(2.0:99.1) as benchmark series, carry out comparison between one-dimensional digital signal series f(j) and the benchmark series f(i), wherein 0≤j≤99. The neighborhood identicalness matching condition of the signal series is $\|v_{ij}-v_{kl}\|\leq 5$, wherein, represents obtaining normal number, $v_{ij}$ represents the disparity vector between any two pixels of the two rows of signal series, i represents the index of the pixels in the signal series f(i), j represents the index of the pixels in the signal series f(j), k is a neighborhood of i, l is a neighborhood of j. Calculate the initial matching probability $$p_{ij}^{(0)} = \frac{1}{1+w_{ij}},$$

wherein, $w_{ij}\Sigma_{|\lambda|\leq k}[g_1(i+\lambda)=g_2(j+\lambda)]^2$, $p_{ij}^{(0)}$ is the initial matching probability, $g_1(i+\lambda)$ represents the gray value of the one-dimensional signal series f(i) at the $(i+\lambda)^{th}$ pixel, $g_2(j+\lambda)$ represents the gray value of the one-dimensional signal series f(j) at the $(j+\lambda)^{th}$ pixel. The current invention utilizes relaxation method, establish the iteration formula of $q_{ij}$: $p_{ij}^{\sim(r)} = Ap_{ij}^{(r-1)}+Bq_{ij}^{(r-1)}$, wherein $$q_{ij} = \sum_k \sum_l p_{kl},$$

r is the number of iterations, A and B are constants. According to the iteration formula, obtain the post-normalization matching probability $$p_{ij}^{(r)} : p_{ij}^{(r)} = \frac{p_{ij}^{\sim(r)}}{\sum_h p_{ij}^{\sim(r)}},$$

wherein, h represents every point that matches i.

The maximum number of iterations of the TDI-CCD camera based on this embodiment is r=100. Through iterative operation, it can be known which diagonal series the result of the matrix converges to.

$$p_{ij}^r = \begin{bmatrix} p_{0,0} & p_{0,1} & p_{0,2} & p_{0,3} & \cdots & p_{0,99} \\ p_{1,0} & p_{1,1} & p_{1,2} & p_{1,3} & \cdots & p_{1,99} \\ p_{2,0} & p_{2,1} & p_{2,2} & p_{2,3} & \cdots & p_{2,99} \\ p_{3,0} & p_{3,1} & p_{3,2} & p_{3,3} & \cdots & p_{3,99} \\ \vdots & \vdots & \vdots & \vdots & \ddots & \vdots \\ p_{99,0} & p_{99,1} & p_{99,2} & p_{99,3} & \cdots & p_{99,99} \end{bmatrix}, 1 \leq R \leq 100.$$

When converging to the leading diagonal series, i.e., $p_{0,0}\approx 1$, $p_{1,1}\approx 1$, $p_{2,2}\approx 1$, ..., the iterating trend of the other elements approaches 0, and $\Delta y=0$ here.

When converging to a certain diagonal series in the upper triangle of the matrix, i.e., $p_{0,j}\approx 1$, $p_{1,j+1}\approx 1$, $p_{2,j+2}\approx 1$, ..., the iterating trend of the other elements approaches 0, and here $\Delta y=0-j$.

When converging to a certain diagonal series in the lower triangle of the matrix, i.e., $p_{0,i}\approx 1$, $p_{1,i+1}\approx 1$, $p_{2,i+2}\approx 1$, ..., the iterating trend of the other elements approaches 0, and here $\Delta y=0-i$.

Through iterative operation, $\Delta y$ can be calculated, when the matrix does not converge after 100 times of iterations, the iterative operation is stopped, the two rows of signal series lack similarity.

S5. Carry out offset calculation, including:

carry out similarity comparison between the digital signal series f(3,0:99,2) formed by the first 100 pixels of the third row of $G_2$ with the benchmark signal series f(2,0:99,1), if $|\Delta y|\leq 5$ in this comparison, they are considered to correspond to the integration energy of the same instant field of view, then the identical point that point $g_2(2,0+\Delta y)$ in $G_2$ corresponds to in $G_1$ is $g_1(1,0)$;

if the shift $|\Delta y|>5$, it illustrates that different instant fields of view are corresponded to, then similarity comparison is carried out between the digital signal series f(2,0:99,2) formed by the first 100 pixels of the second row of $G_2$ and the benchmark signal series f(2,0:99,1), $|\Delta y|\leq 5$ in this comparison, it is considered that they correspond to the integration energy of the same instant field of view, then the tie point that point $g_2(1,0+\Delta y)$ in $G_2$ corresponds to in $G_1$ is $g_1(1,0)$;

if the shift $|\Delta y|>5$, it illustrates that different instant fields of view are corresponded to, then similarity comparison is carried out between the digital signal series f(4,0:99,2) formed by the first 100 pixels of the fourth row of $G_2$ and the benchmark signal series f(2,0:99,1), $|\Delta y|\leq 15$ in this comparison, it is considered that they correspond to the integration energy of the same instant field of view, then the tie point that point $g_2(3,0+\Delta y)$ in $G_2$ corresponds to in $G_1$ is $g_1(1,0)$;

if the shift $|\Delta y|>5$, it illustrates that different instant fields of view are corresponded to, then similarity comparison is carried out between the digital signal series f(1,0:99,2) formed by the first 100 pixels of the first row of $G_2$ and the benchmark signal series f(2,0:99,1), if $|\Delta y|\leq 5$ in this comparison, they are considered to correspond to the integration energy of the same instant field of view, then the tie point that point $g_2(0,0+\Delta y)$ in $G_2$ corresponds to in $G_1$ is $g_1(1,0)$;

if the shift |Δy|>5, it illustrates that different instant fields of view are corresponded to, then similarity comparison is carried out between the digital signal series f(5,0:99,2) formed by the first 100 pixels of the fifth row of $G_2$ and the benchmark signal series f(2,0:99,1), |Δy|≤15 in this comparison, it is considered that they correspond to the integration energy of the same instant field of view, then the tie point that point $g_2(4,0+\Delta y)$ in $G_2$ corresponds to in $G_1$ is $g_1(1,0)$;

if the shift |Δy|>5, it illustrates that different instant fields of view are corresponded to.

Thus, carry out Comparing loop on the neighborhoods that the benchmark signal corresponds to, establish the corresponding relationships between the first corresponding tie points $g_1(x_1, y_1)$ and $g_2(x_2, y_2)$ by the comparison of the benchmark signal series and the neighboring series in the next image.

S6. The corresponding relationship in similarity on the row dimension that the one-dimensional digital series have ensures that each one-dimensional signal series afterwards in the two images are corresponding one-to-one in similarity, and thus the s(32−4≤s≤32−1) known corresponding points can finally be found, that is, these s corresponding tie points $g_1(x_1, y_1)$ and $g_2(x_2, y_2)$ are known. In combination with bivariate quadratic polynomial, using least squares method, $x_1$ and $y_1$ are obtained by carrying out surface fitting of the data of the corresponding tie points:

$$x_1 = a_{00} + a_{10}x_2 + a_{01}y_2 + a_{11}x_2y_2 + a_{20}x_2^2 + a_{02}y_2^2$$

$$y_1 = b_{00} + b_{10}x_2 + b_{01}y_2 + b_{11}x_2y_2 + b_{20}x_2^2 + b_{02}y_2^2,$$

by the $x_1$ and $y_1$ obtained, on the second image, use this bivariate quadratic polynomial to carry out spatial geometrical correction and use double direction interpolation to carry out pixel gray value reassignments.

S7. According to the process described above, first use the reference image coordinate system that uses $G_2$ as the benchmark to carry out geometrical corrections and pixel interpolations on $G_3$, then in combination with the spatial relationship obtained of $G_2$ and $G_1$, carry out correction on $G_3$ based on $G_1$. Repeating this step, carry out corrections on $G_4, G_5, G_6 \ldots G_{32}$.

S8. Cause the one-dimensional signal series having the same instant field of view in the area array images obtained by the corrections described above to superimpose in the coordinate system, only complete the addition of 30 rows of signal series having the same instant field of view, forming one row of digital image removed of oscillation effects, the effect being analogous to integration of 30 stage.

$$E = \int_{\Delta S} \rho(x, y) E_{in}(x, y) ds$$

$$g(x, y) = k \cdot E = k \cdot \int_{\Delta S} \rho(x, y) E_{in}(x, y) ds,$$

wherein, ρ(x, y) represents the spectral reflective ratio of waveband feature ground objects, $E_{in}(x, y)$ represents the radiation energy of the waveband through a unit area in a unit time, k is the gain coefficient. The pixel gray value of the final image with reduced effects of oscillation is $\tilde{g}(x, y)$:

$$\tilde{g}(x, y) = \sum_{m=1}^{30} g_m(x, y).$$

According to spatial and chronological orders, arrange each row of the digital images obtained after superposition and with reduced effects of oscillations, finally forming digital images with reduced effects of oscillations.

The invention claimed is:

1. A method for reducing blurs of TDI-CCD camera images, in which the target surface that supports the TDI-CCD camera is set to be n columns and m rows, wherein the method for reducing blurs includes the following steps:

S1. establish a coordinate system of the image: the direction of the number of pixels on the TDI-CCD camera area array, which is the direction of columns, is the Y axis, while the direction of the grades of the pixels on the TDI-CCD camera area, which is the direction of rows, is the X axis, the upper left corner of the image is the starting point of the coordinate system, wherein the coordinate for the first row and first column is (0,0);

S2. read the area array images of the TDI-CCD camera outputted from each integration and carry out numbering of the images: the images are sequentially numbered as $G_1, G_2, G_3 \ldots G_t \ldots G_m$;

S3. carry out decomposition on the area array images: decompose each image read in S2 by rows, each area array image outputted from the integration grades is decomposed into m rows, each row having n pixels, each row forms a one-dimensional digital signal after decomposition, the signal length being n, the first N pixels are extracted from each one-dimensional digital signal, respectively forming one-dimensional digital signal series that is recorded as f(t), wherein 0≤t≤m, 0≤N≤n;

S4. according to the one-dimensional digital signal series of S3, construct similarity matching rules for two one-dimensional signal series, including:

S41. select signal series f(i) as the benchmark series, carry out comparison between the signal series f(j) and the benchmark signal series, the neighborhood identicalness matching condition for the signal series is: $\|v_{ij} - v_{kl}\| \leq 5$, wherein $\|*\|$ represents obtaining normal number, $v_{ij}$ represents the disparity vector between any two pixels of the two rows of signal series, i represents the index of the pixels in the signal series f(i), j represents the index of the pixels in the signal series f(j), k is a neighborhood of i, l is a neighborhood of j;

S42. calculate the initial matching probability according to said neighborhood identicalness matching condition of the signal series of S41:

$$P_{ij}^{(0)} = \frac{1}{1 + w_{ij}},$$

wherein $w_{ij} = \Sigma_{|\lambda| \leq k}[g_1(i+\lambda) - g_2(j+\lambda)]^2$, $p_{ij}^{(0)}$ is the initial matching probability, $g_1(i+\lambda)$ represents the gray value of the one-dimensional signal series f(i) at the $(i+\lambda)^{th}$ pixel, $g_2(j+\lambda)$ represents the gray value of the one-dimensional signal series f(j) at the $(j+\lambda)^{th}$ pixel;

S43. according to relaxation method, establish the iteration formula of $q_{ij}$: $p_{ij}^{(r)} = Ap_{ij}^{(r-1)} + Bq_{ij}^{(r-1)}$, wherein $$q_{ij} = \sum_k \sum_l p_{kl},$$

r is the number of iterations, A and B are constants;

S44. according to the iteration formula of S43, obtain the post-normalization matching probability $$p_{ij}^{(r)} : p_{ij}^{(r)} = \frac{\tilde{p}_{ij}^{(r)}}{\sum_h \tilde{p}_{ij}^{(r)}},$$

wherein, h represents every point that matches i;

S45. the converging diagonal series of $p_{ij}'$ can be known according to the matching probability obtained in S44, wherein the matching probability $p_{ij} \approx 1$, and other elements approach 0, wherein, $$p_{ij}^r = \begin{bmatrix} p_{0,0} & p_{0,1} & p_{0,2} & p_{0,3} & \cdots & p_{0,N-1} \\ p_{1,0} & p_{1,1} & p_{1,2} & p_{1,3} & \cdots & p_{1,N-1} \\ p_{2,0} & p_{2,1} & p_{2,2} & p_{2,3} & \cdots & p_{2,N-1} \\ p_{3,0} & p_{3,1} & p_{3,2} & p_{3,3} & \cdots & p_{3,N-1} \\ \vdots & \vdots & \vdots & \vdots & \ddots & \vdots \\ p_{N-1,0} & p_{N-1,1} & p_{N-1,2} & p_{N-1,3} & \cdots & p_{N-1,N-1} \end{bmatrix};$$

S5. Conduct offset calculation according to the neighborhood matching calculation results of S4, obtain the tie points in the images, including:
  S51. select the upper and lower neighborhoods corresponding to the benchmark signal series for cycle comparison, establish the corresponding relationship for the first pair of tie points $g_1(x_1,y_1)$ and $g_2(x_2,y_2)$ by comparing the benchmark signal series and the neighboring series in the next image;
  S52. determine s known corresponding points of the images according to the corresponding relationship of similarity on the row dimension of the one-dimensional digital signal obtained in S51, in combination with bivariate quadratic polynomial, using least square method, obtain $x_1$ and $y_1$ by carrying out surface fitting of the data for the corresponding tie points:

$$x_1 = a_{00} + a_{10}x_2 + a_{01}y_2 + a_{11}x_2y_2 + a_{20}x_2^2 + a_{02}y_2^2$$

$$y_1 = b_{00} + b_{10}x_2 + b_{01}y_2 + b_{11}x_2y_2 + b_{20}x_2^2 + b_{02}y_2^2;$$

S6. conduct spatial geometric correction on the images according to $x_1$ and $y_1$ obtained in S5, and use double direction linear interpolation to carry out pixel gray value reassignments;

S7. repeat step S3 to step S6 on subsequent images relative to the benchmark image G1;

S8. superimpose the one-dimensional signal series having the same instant field of view in the corrected images in the coordinate system to become the first row of digital image of the images with the oscillation effects removed, repeat step S3 to step S8, arrange each row of the superimposed image obtained with the reduced oscillation effects according to spatial and chronological order to form digital images with the oscillation effects reduced.

2. The method for reducing blurs of TDI-CCD camera images of claim 1, characterized in that: said k of S41 is the neighborhood of i that meets the identicalness matching condition, said l is the neighborhood of j that meets the identicalness matching condition.

3. The method for reducing blurs of TDI-CCD camera images of claim 1, characterized in that: $0 \leq i \leq N-1$, $0 \leq j \leq N-1$ in S41.

4. The method for reducing blurs of TDI-CCD camera images of claim 1, characterized in that: said number of iterations r of S43 satisfies $1 \leq r \leq N$.

5. The method for reducing blurs of TDI-CCD camera images of claim 1, characterized in that: for said s known corresponding points of S52, $m-4 \leq s \leq m-1$.

* * * * *